US010320220B2

(12) United States Patent
Ge et al.

(10) Patent No.: US 10,320,220 B2
(45) Date of Patent: Jun. 11, 2019

(54) CONFIGURABLE HYBRID DRIVE SYSTEMS

(71) Applicant: Ford Global Technologies, LLC, Dearborn, MI (US)

(72) Inventors: Baoming Ge, Okemos, MI (US); Lihua Chen, Farmington Hills, MI (US); Shuitao Yang, Canton, MI (US); Yan Zhou, Canton, MI (US); Fan Xu, Novi, MI (US); Mohammed Khorshed Alam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 15/684,657

(22) Filed: Aug. 23, 2017

(65) Prior Publication Data

US 2019/0061537 A1    Feb. 28, 2019

(51) Int. Cl.
*H02P 25/18* (2006.01)
*H02J 7/02* (2016.01)
*B60L 11/18* (2006.01)
*H02K 3/28* (2006.01)
*H02J 7/00* (2006.01)

(52) U.S. Cl.
CPC .......... *H02J 7/022* (2013.01); *B60L 11/1803* (2013.01); *B60L 11/1814* (2013.01); *H02K 3/28* (2013.01); *H02P 25/18* (2013.01); *H02J 2007/0059* (2013.01)

(58) Field of Classification Search
CPC .............................. B60L 11/1814; H02P 25/18
USPC ......................................................... 318/400
See application file for complete search history.

(56) References Cited

U.S. PATENT DOCUMENTS

| 5,341,075 | A | 8/1994 | Cocconi | |
|---|---|---|---|---|
| 5,717,303 | A | 2/1998 | Engel | |
| 5,760,567 | A * | 6/1998 | Nakamura | H02P 25/20 310/184 |
| 6,255,797 | B1 * | 7/2001 | Nakamura | H02P 25/20 318/771 |
| 8,810,060 | B2 | 8/2014 | Kamaga | |
| 9,018,809 | B2 | 4/2015 | Rippel et al. | |
| 2004/0000884 | A1 * | 1/2004 | Inao | H02P 6/14 318/400.28 |
| 2011/0050136 | A1 * | 3/2011 | Sumi | B60L 3/04 318/400.3 |
| 2013/0113279 | A1 * | 5/2013 | Hatanaka | B60L 9/22 307/9.1 |
| 2014/0121867 | A1 * | 5/2014 | Tamai | B60W 10/06 701/22 |
| 2014/0217946 | A1 * | 8/2014 | Kume | H02P 25/188 318/497 |
| 2014/0265971 | A1 | 9/2014 | Taube et al. | |
| 2014/0306663 | A1 | 10/2014 | Ngo et al. | |

(Continued)

*Primary Examiner* — Bickey Dhakal
*Assistant Examiner* — Devon A Joseph
(74) *Attorney, Agent, or Firm* — David Kelley; Brooks Kushman, P.C.

(57) ABSTRACT

A powertrain for a vehicle includes an electric machine and a controller. The electric machine has electrically isolated windings and is coupled with an inverter. The controller may be programmed to configure respective terminals of the windings to form a Y-connection, and responsive to an electrical connection between the vehicle and a 3-phase power grid, reconfigure the respective terminals such that each is coupled to a respective phase of the 3-phase power grid.

17 Claims, 6 Drawing Sheets

(56) References Cited

U.S. PATENT DOCUMENTS

| | | | | |
|---|---|---|---|---|
| 2014/0354195 A1* | 12/2014 | Li | ................... | B60L 11/1861 |
| | | | | 318/139 |
| 2015/0069936 A1* | 3/2015 | Jang | ................... | B60L 11/1803 |
| | | | | 318/139 |
| 2016/0268916 A1* | 9/2016 | Ramsay | ............... | H02M 5/458 |
| 2016/0288660 A1 | 10/2016 | Yang et al. | | |
| 2017/0256984 A1* | 9/2017 | Ding | ................... | F01M 1/00 |
| 2018/0175757 A1* | 6/2018 | Tanimoto | ............ | B25F 5/00 |

\* cited by examiner

CONFIGURABLE HYBRID DRIVE SYSTEMS

TECHNICAL FIELD

This application is generally related to an electric machine and inverter system selectively configurable to operate in a charger or propulsion mode.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current. The traction battery is alternatively referred to as a high-voltage battery. However, improved performance of electric machines may be achieved by operating in a different voltage range, typically at voltages greater than the traction battery terminal voltage. Likewise, the current requirements to drive a vehicular electric machine are commonly referred to as high current.

Also, many electrified vehicles include a DC-DC converter, also referred to as a variable voltage converter (VVC), to convert the voltage of the traction battery to an operational voltage level of the electric machine. The electric machine, that may include a traction motor and a generator, may require high voltage and high current. Due to the voltage and current requirements, a battery module and a power electronics module are typically in continuous communication.

SUMMARY

A powertrain for a vehicle includes an electric machine and a controller. The electric machine has electrically isolated windings and is coupled with an inverter. The controller may be programmed to configure respective terminals of the windings to form a Y-connection, and responsive to an electrical connection between the vehicle and a 3-phase power grid, reconfigure the respective terminals such that each is coupled to a respective phase of the 3-phase power grid.

A method of controlling a powertrain by a controller includes, responsive to an electrical connection between a 3-phase power grid and an electric vehicle containing the powertrain, decoupling windings of a Y-connection of an electric machine of the powertrain to electrically isolate the windings, and coupling each of the electrically isolated windings to a phase of the 3-phase power grid.

A vehicle powertrain includes an electric machine and a switch. The electric machine has electrically isolated windings. The switch may be configured to couple respective terminals of the windings to form a Y-connection, and responsive to an electrical connection between the vehicle and a single-phase power grid, disconnect the Y-connection, couple a capacitor between a first winding terminal and a second winding terminal, and couple the second winding terminal and a third winding terminal to the single-phase power grid.

DETAILED DESCRIPTION

Figure 1:
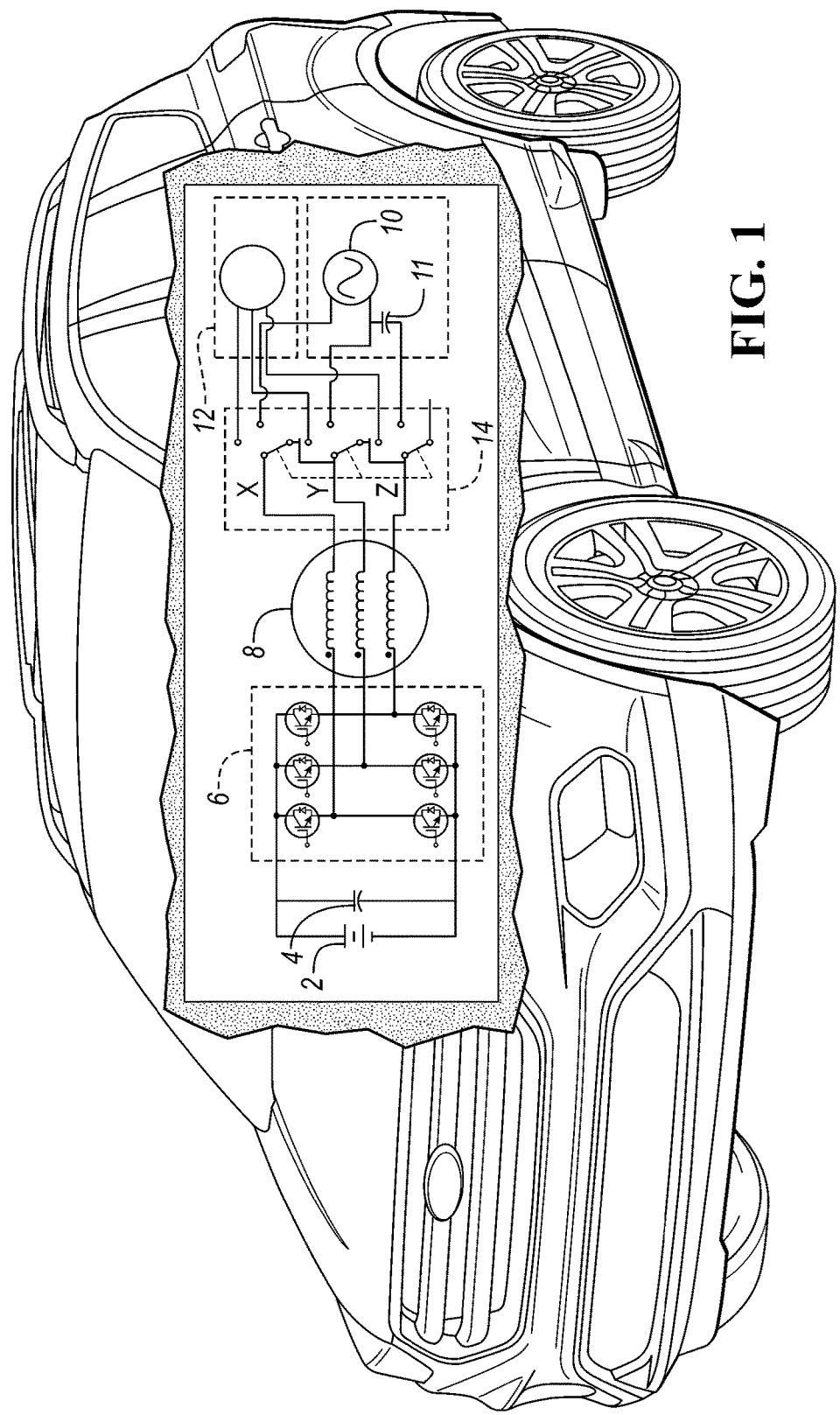
FIG. 1 is a diagram of an electrified vehicle with an inverter and an electric machine selectively configured to provide propulsive force or to charge from an AC grid.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A single phase alternate current (AC) charger for electric vehicles typically passes an AC ripple at various frequencies. Typically, the most noticeable frequency component is the component at twice the grid or line frequency, and the grid input power has a pulsing shape with a dc offset (Pin_dc), a large AC component at twice the line frequency and a peak to peak value of 2(Pin_dc). This power ripple causes a current ripple at twice the grid frequency on the battery side such that extra circuitry may be required to protect the battery. Also, there are current ripples at other frequencies, such as different orders of harmonics due to grid distortion and the switching frequency of a charger's semiconductor switches. To filter these ripples, a large dc-link capacitor is required in the charger. This bulk capacitor increases the cost, volume and weight of the charger.

As the electric vehicle is not in motion during AC grid charging, its electrical drive system (e.g., powertrain or E-drive system), which includes a traction drive inverter and an electric machine, is typically disconnected from the battery. Here, an apparatus and method is presented that utilizes the E-drive system and operates it as a low frequency current compensator during charging. In another embodiment, the controller for the powertrain is configured to modulate switches of the inverter during AC grid charging, at a frequency greater than the line frequency, to flow a current through one phase winding of the electric machine such that the current returns via a different phase winding of the electric machine.

An integrated on-board battery charger system for electric vehicles was disclosed in U.S. Pat. No. 5,341,075, issued Aug. 23, 1994, which is incorporated by reference in its entirety. During battery charging, the electric machine does not rotate. The powertrain system is a combined battery charger and motor drive system that employs a conventional pulse width modulated (PWM) inverter and an electric machine which is configurable to operate in a battery charge mode and propulsion mode. Single-phase AC power is applied across the circuit when configured in the single-phase mode, and the inverter switches are then controlled to operate as a boost switching regulator. In another embodiment, 3-phase AC power is applied across to the circuit when configured in the 3-phase mode, and the inverter switches are controlled to operate as a boost switching regulator. This integrated on-board battery charge system eliminates the need for an extra AC/DC converter, power factor correction (PFC), and DC-DC converter. Even though additional switches are required to reconfigure this circuit, extra weight, volume, and cost are significantly reduced when compared with a traditional on/off-board battery charge system.

However, there is double line frequency ripple power flowing back and forth between AC and DC sides during battery charging. Assume the voltage and current of single-phase grid interfaced with the inverter are:

$$u_s = \sqrt{2} V_o \sin \omega t \quad (1)$$

$$i_s = \sqrt{2} I_o \sin(\omega t - \varphi) \quad (2)$$

In which $\omega$ is the line angular frequency, $\varphi$ is the phase angle. The instantaneous power flowing through the dc and ac sides is $$p_{grid} = V_o I_o \cos \varphi - V_o I_o \cos(2 \omega t - \varphi) \quad (3)$$

This instantaneous power includes the constant active power $P_{dc}$ (i.e., DC power) that charges the battery and the double line frequency (2$\omega$) ripple power that flows back and forth between the AC and DC sides. When the system is at unity power factor, the maximum power flowing into the dc side is doubled when compared with the battery charging power $P_{dc}$. If power factor is less than one, there is negative instantaneous power flowing into the dc side.

For example, a conventional integrated on-board battery charger system operating with a unity power factor, when an average power of 14.4 kW is charged into the battery, the peak power going into the battery may peak at 28.8 kW, in which the current in the dc side presents a double line frequency feature and the (2$\omega$) current ripple component may have an amplitude of up to 44.5 Amps, which increases the total current ripple.

Here, a new integrated on-board battery charge system is configurable to eliminate the double line frequency ripple power from the DC side such that a ripple current of the battery and the DC capacitor are greatly reduced.

FIG. 1 depicts a battery electric vehicle illustrating internal electric powertrain components configured to flow a current through windings of an electric machine 8 by operating the electric machine inverter 6 while charging a high voltage traction battery 2 and associated capacitor 4 via a switch 14 that is coupled between an AC grid (e.g., single-phase AC grid 10 or 3-phase AC grid 12) and electric machine 8. In an embodiment, a controller (e.g., the electric machine inverter controller) may selectively engage or couple windings of the electric machine 8 in a "Y" or wye configuration to form a neutral node for use during operation in a propulsion mode. Also, the controller may configure the switch 14 such that each winding of the electric machine 8 is coupled with a corresponding phase of a 3-phase AC grid supply 12 or a single-phase AC grid supply 10 and capacitor 11. After which the controller may modulate switches of the inverter 6 to reduce a double line frequency ripple current of dc side. Here, a controller (e.g., the electric machine inverter controller) may selectively modulate switches of the inverter 6 to make capacitor 11 absorb ripple current from the AC grid 10. In this figure, the switch is illustrated as a triple-pole triple-throw switch, but may be implemented as a double-pole triple-throw if, for example the system is configured with one charge mode and one propulsion mode. In another embodiment, the switch 14 may be individual switches that are controlled by a controller to protect for shoot through conditions during transitions.

The on-board battery charger system includes three operational modes, first, a motor drive mode in which the motor provides a propulsive force, second, a 3-phase battery charge mode in which the each phase of the electric machine is directly coupled to a corresponding phase of a 3-phase power grid, and third, a single-phase charge mode in which the two phases of the electric machine are directly coupled with the single phase power grid and the third phase is coupled to the single phase power grid via a capacitor. For the second and third modes, the electric machine does not substantially rotate and the battery is charged through the motor windings (motor phase windings) connected to the grid.

Figure 2:
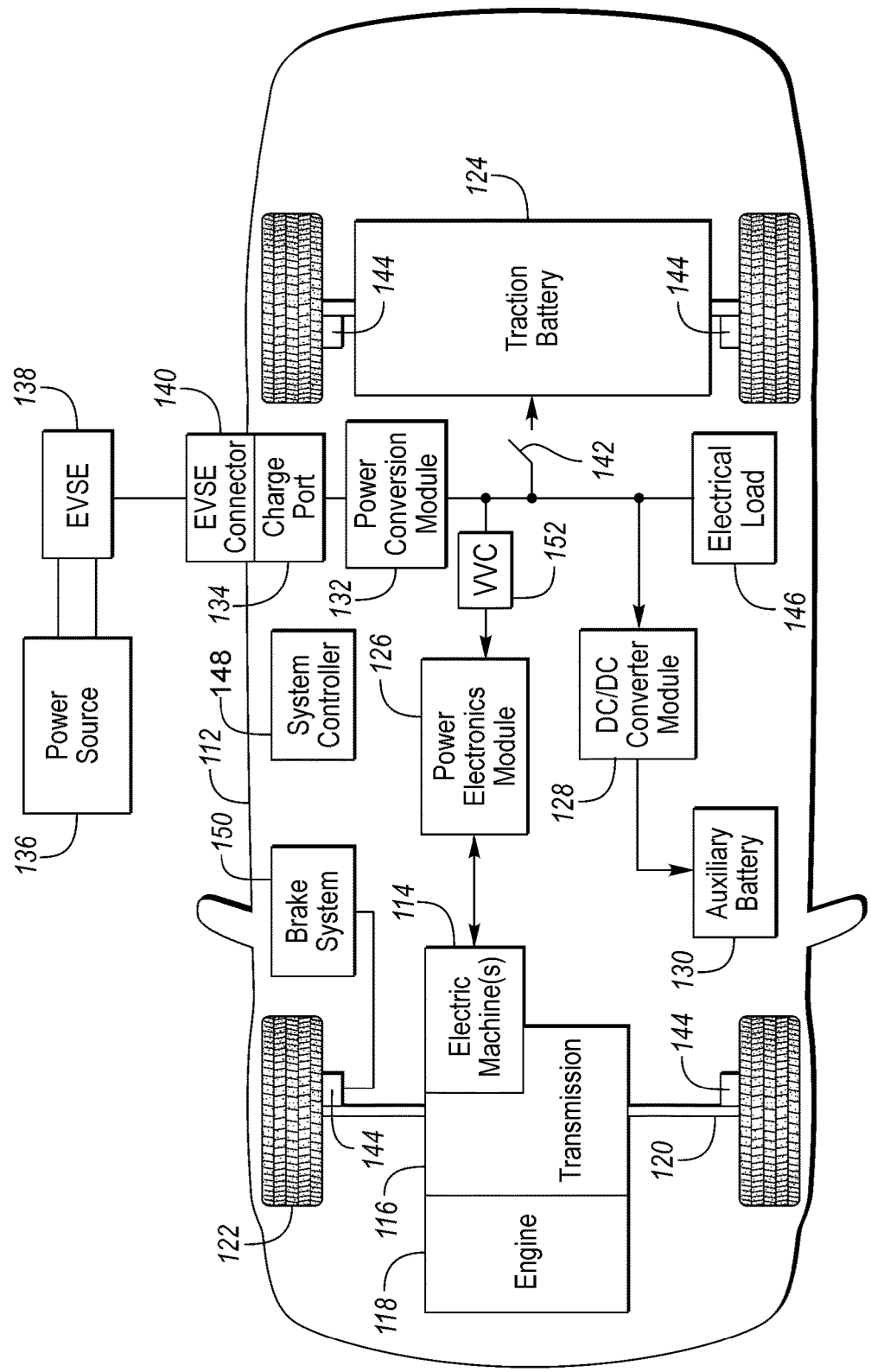
FIG. 2 is a diagram of a hybrid vehicle illustrating typical drivetrain and energy storage components including AC grid charging components.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high-voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 2 but it may be implied that the vehicle network may connect to any electronic module that is present in the vehicle 112. A vehicle system controller (VSC) 148 may be present to coordinate the operation of the various components.

Often the VVC 152 is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller that monitors and controls electrical parameters (e.g., voltage and current) at various locations within the VVC 152. In some configurations, the VVC controller may be included as part of the VVC 152. The VVC controller may determine an output voltage reference, $V^*_{dc}$. The VVC controller may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller may command the VVC 152 to provide the desired output voltage using the control signal. The particular control signal at which the VVC 152 is operated may be directly related to the amount of voltage boost to be provided by the VVC 152.

With reference to FIG. 2, the VVC 152 may boost or "step up" the voltage potential of the electrical power provided by the traction battery 124. The traction battery 124 may provide high-voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor may be electrically coupled in parallel with the traction battery 124. The input capacitor may reduce any voltage and current ripple. The VVC 152 may receive the HV DC power and boost or "step up" the voltage potential of the input voltage according to the duty cycle. Often an output capacitor is electrically coupled between the output terminals of the VVC 152 and the input of the power electronics module 126 to stabilize the bus voltage and reduce voltage and current ripple at the output of the VVC 152.

Figure 3:
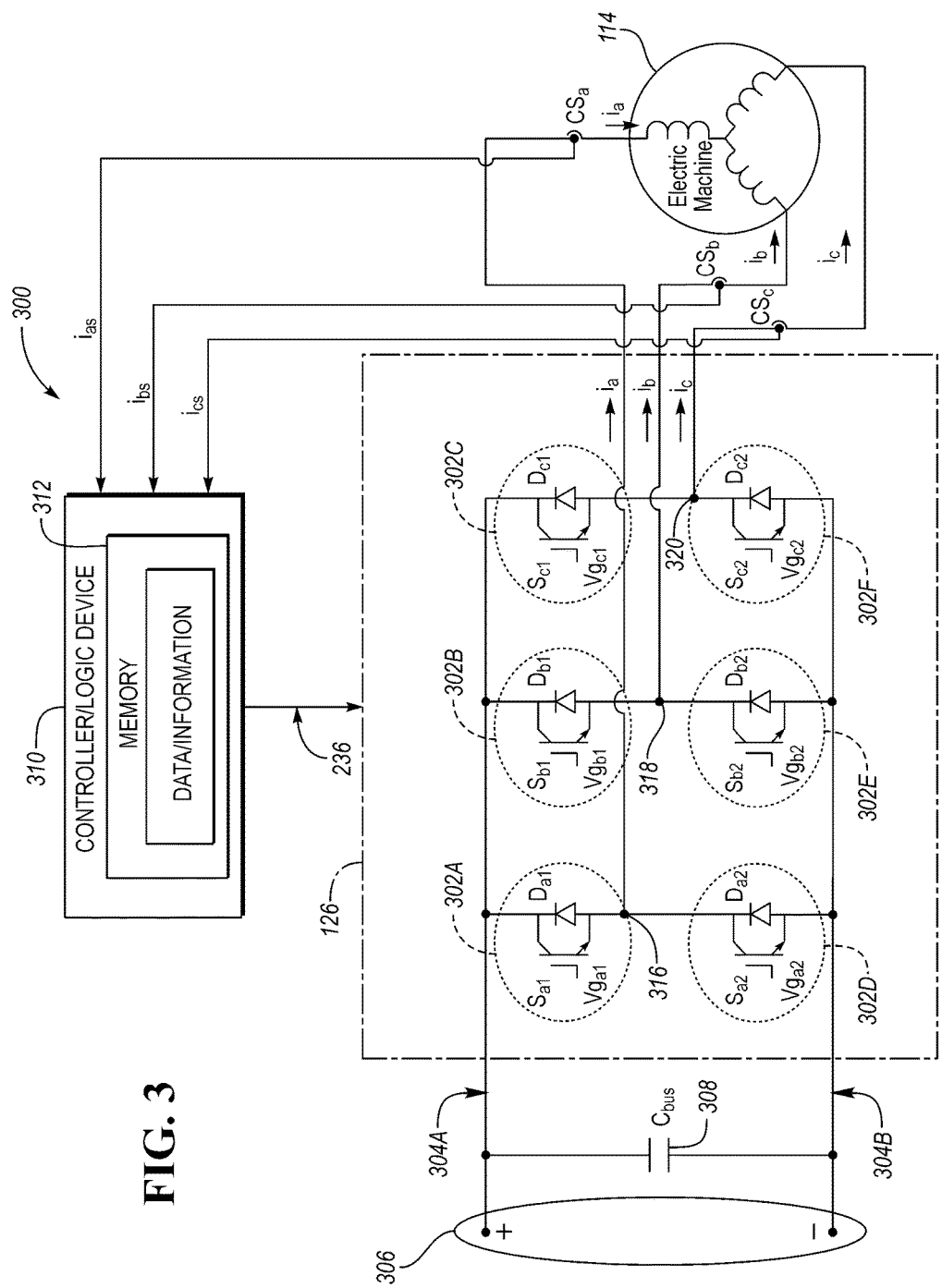
FIG. 3 is a schematic diagram of a power inverter supplied electric machine drive system.

With reference to FIG. 3, a system 300 is provided for controlling a power electronics module (PEM) 126. The PEM 126 of FIG. 3 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having more power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The AC power is transmitted via the phase currents ia, ib, and is to drive an AC machine also referred to as an electric machine 114, such as a three-phase permanent-magnet synchronous motor (PMSM) as depicted in FIG. 3. In such an example, the DC power link 306 may include a DC storage battery to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 3, each of the phase legs 316, 318, 320 in the inverter includes power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 3. Similarly, the power switches $S_{b1}$, $S_{b2}$, $D_{b1}$ and $D_{b2}$ are part of phase leg B 318 and the power switches $S_{c1}$, $S_{c2}$, $D_{c1}$, and $D_{c2}$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ are provided to sense current flow in the respective phase legs 316, 318, 320. FIG. 3 shows the current sensors $CS_a$, $CS_b$, and $CS_c$ separate from the PEM 126. However, current sensors $CS_a$, $CS_b$, and $CS_c$ may be integrated as part of the PEM126 depending on its configuration. Current sensors $CS_a$, $CS_b$, and $CS_c$ of FIG. 3 are installed in series with each of phase legs A, B and C (i.e., phase legs 316, 318, 320 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320. Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 126. However, the DC-bus capacitor 308 may be integrated as part of the PEM 126.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 3. However, the memory 312 may be positioned in any suitable location accessible by the controller 310.

As illustrated in FIG. 3, the controller 310 transmits at least one control signal 236 to the power converter system 126. The power converter system 126 receives the control signal 236 to control the switching configuration of the inverter and therefore the current flow through the respective phase legs 316, 318, and 320. The switching configuration is a set of switching states of the power switches 302 in the inverter. In general, the switching configuration of the inverter determines how the inverter converts power between the DC power link 306 and the electric machine 114.

To control the switching configuration of the inverter, the inverter changes the switching state of each power switch 302 in the inverter to either an ON state or an OFF state based on the control signal 236. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive signal for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 3, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state.

Two situations can occur during an active state of the three-phase converter example illustrated in FIG. 3: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

Solid state devices (SSD), such as Insulated Gate Bipolar junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of SSDs or high-power relays may be used to control, alter, or modulate a current between a battery and an electric machine of a vehicle.

Figure 4:
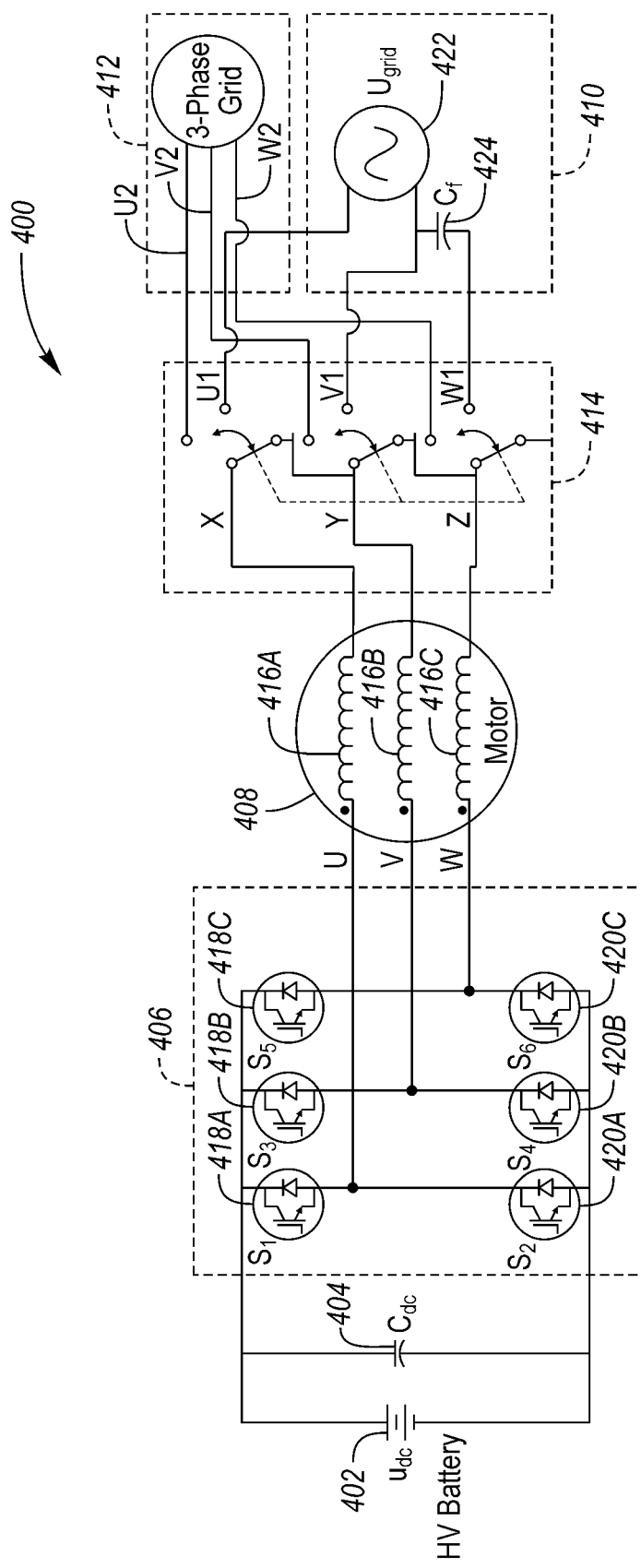
FIG. 4 is a diagram of a battery electric vehicle powertrain including a switch configured to toggle between a charge mode and a propulsion mode.

FIG. 4 is a diagram of a battery electric vehicle powertrain 400 including a traction battery 402, a dc bus capacitor 404, an inverter 406, electric machine 408 that may be configured to provide torque to drive a wheel of the vehicle or generate a current by utilizing rotational force of the wheel to rotate the electric machine 408. The electric machine is coupled with an electric machine inverter 406 that converts a direct current (DC) current to an alternating current (AC) current. During operation of the vehicle, a high voltage traction battery 402 is used to provide a propulsive force to rotate the electric machine and store energy captured by the electric machine from rotational energy of the wheel. When the vehicle is not in motion it may be desirable to increase the battery 402 state of charge (SOC) by coupling the battery 402 with an AC power grid 410, 412 via a switch 414. One artifact of the use of an AC grid is that harmonics of the low frequency may be propagated to the battery 402 and components of the powertrain. Here, the capacitor 404 and battery 402 are selectively coupled with the grid 410, 412 via switch 414 and the switches (418A, 418B, 418C, 420A, 420B, and 420C) of the inverter 406 are modulated to reduce ripple power of dc side via the inductive windings 416A, 416B, and 416C of the electric machine 408. This also allows a ripple current to be absorbed by the capacitor 404 when engaged by the switches 418 and 420. The current is controlled via pull-up switches 418A, 418B, and 418C and pull-down switches 420A, 420B, and 420C, these switches are also referred to as high-side switches 418A, 418B, and 418C and low-side switches 420A, 420B, and 420C.

This on-board battery charger system 400 includes three operational modes, first, a motor drive mode in which the motor 408 provides a propulsive force, second, a 3-phase battery charge mode in which the each phase 416 of the electric machine 408 is directly coupled to a corresponding phase (U2, V2, and W2) of a 3-phase power grid 412, and third, a single-phase charge mode in which the two phases (416A and 416B) of the electric machine 408 are directly coupled with the single phase power grid 422 and the third phase 416C is coupled to one of V1 or U1 of single phase power grid 422 via a capacitor 424. For the second and third modes, the electric machine 408 does not rotate and the battery 402 is charged through the motor windings 416 (motor phase windings) connected to the grid 410, 412.

In the motor drive mode, the switch 414 is moved downward such that the X is connected to the Y and the Y is connected to the Z, so that three terminals X, Y, and Z are tied together and the motor windings are in Y-connection.

In the battery charging from a three-phase grid, switch 414 connects U2, V2, and W2, with phase windings U, V, and W (416A, 416B, 416C) respectively. Control strategies such as current closed-loop or voltage closed-loop for the inverter 406 are used to perform three-phase grid-tie rectification to charge the battery 402 without the double line frequency ripple power.

Figure 5:
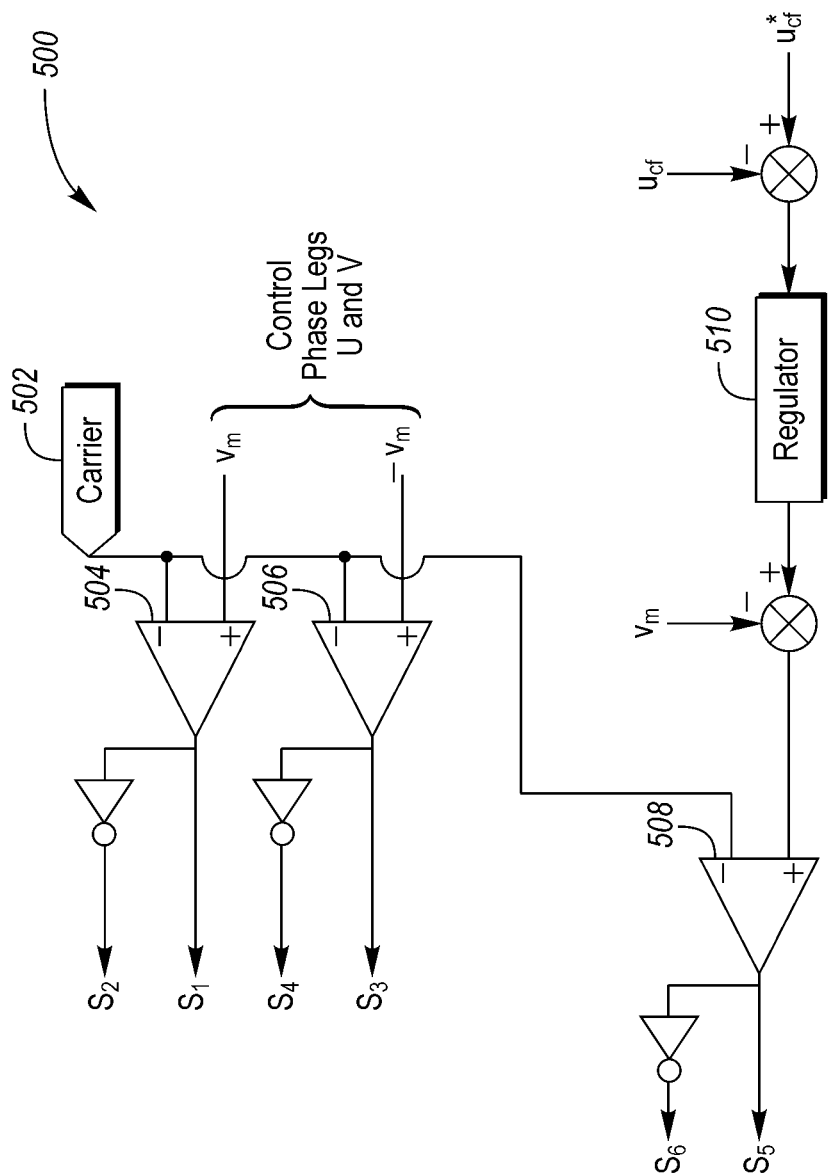
FIG. 5 is a block diagram of a single-phase battery charging control method for a charger system including a control strategy for buffering the double line frequency ripple power.

In the single-phase battery charge mode, the battery is charged from a single-phase grid 422 with switch 414 coupling the single-phase grid 422 and phase legs U and V (416A and 416B). Control methods such as current closed-loop or voltage closed-loop are applicable to produce the modulating signal $v_m$ shown in FIG. 5. The third phase leg W 416C is configured and coupled to capacitor 424 via switch 414 to absorb the 2ω ripple power from the output side of H-bridge inverter. FIG. 5 also illustrates a control method to manage the switches S5 and S6 (418C and 420C) to buffer the 2ω ripple power in capacitor 424.

As shown in FIG. 5, the modulation signal $v_m$ is generated using control methods such as current closed-loop or voltage closed-loop to charge the battery (e.g., 402). The control action is implemented by the switches S1-S4 (e.g., 418A, 418B, 420A, and 420B). The phase leg W with switches S5 and S6 (e.g., 418C and 420C) is controlled to eliminate the double line frequency ripple power from the dc side, the control method is explained as follows.

As shown in FIG. 4, the capacitor $C_f$ 424 is used to buffer the ripple power during single-phase grid charging, in which a capacitor power may be represented as $$P_C = \frac{1}{2}C_f \frac{du_C^2}{dt} = V_o I_o \cos(2\omega t - \varphi) \qquad (4)$$

Based on this circuit and control, the double line frequency ripple power flowing into the dc side may be reduced to substantially zero.

By solving equation (4), the command voltage of capacitor $C_f$ 424 may be represented by $$u_{cf}^*(t) = \sqrt{\frac{2V_o I_o}{\omega C_f}} \sin(\omega t - 0.5\varphi + 45°) \quad (5)$$

to fully buffer the $2\omega$ ripple power in the capacitor $C_f$ 424.

FIG. 5 illustrates a capacitor voltage closed-loop control method 500 that aligns the actual voltage $u_{cf}(t)$ with the reference voltage $u_{cf}^*(t)$, in which the regulator may be a proportional and resonant (PR) controller. Here, a carrier signal 502 is input to three differential amplifiers 504, 506, and 508. The first and second amplifier 504 and 506 have the modulation signal $v_m$ input to control the single-phase control legs (e.g., 416A and 416B). The third amplifier 508 is driven according to equation (5) that is regulated by regulator 510 and then offset by $v_m$. The $v_m$ is subtracted from the output of regulator 510 to cancel the effect of battery charging control. $V_o$, $I_o$, and phase angle $\varphi$ in equation (5) are obtained from the grid voltage and current using a conventional method such as a discrete Fourier transform.

Figure 6:
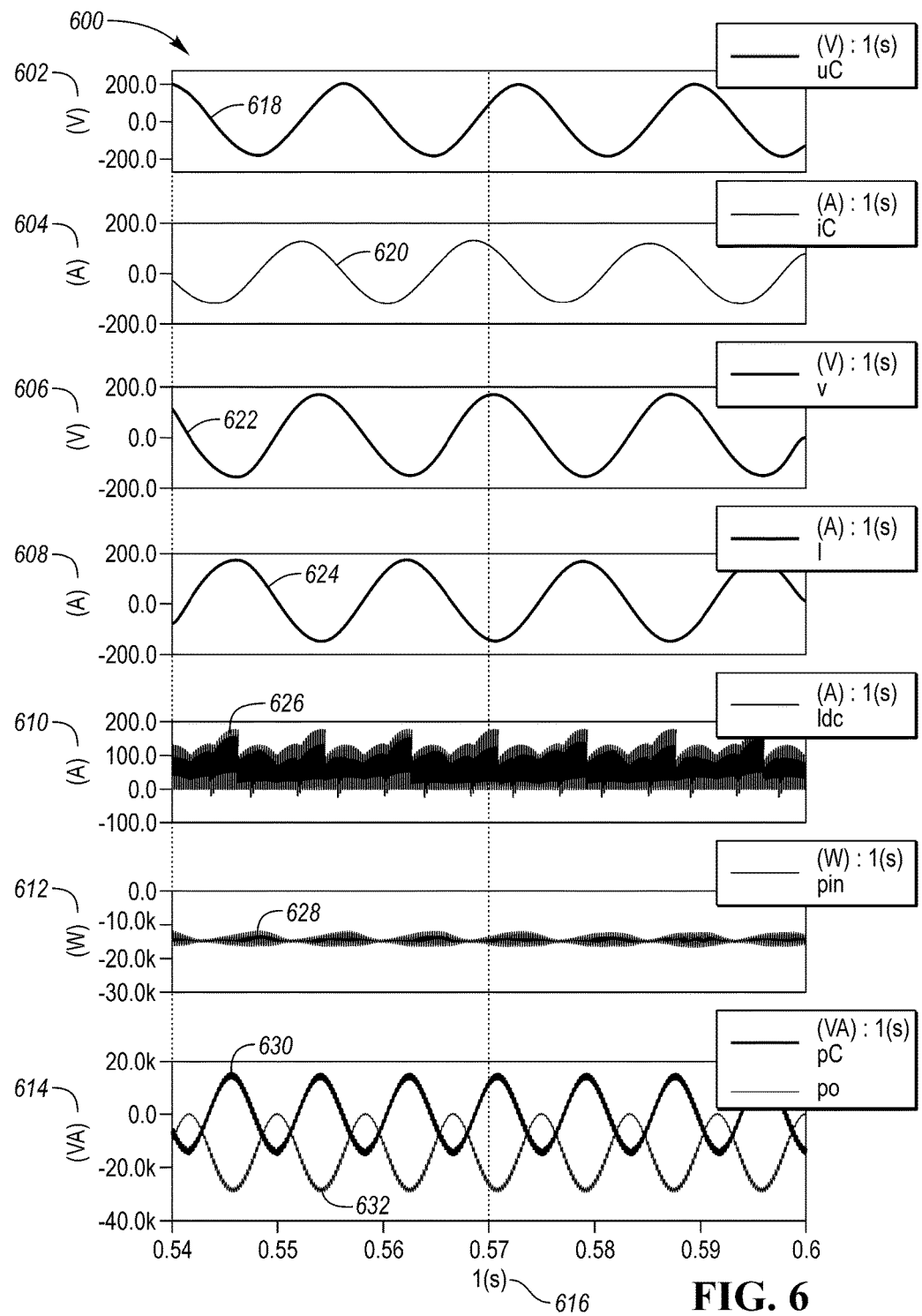
FIG. 6 is a graphical representation of AC characteristics of charging and powertrain components during AC charging of a battery electric vehicle.

FIG. 6 is a graphical representation of AC characteristics 600 of charging and powertrain components during AC charging of a battery electric vehicle. Here, a capacitor voltage 602, capacitor current 604, grid voltage 606, grid current 608, DC bus current 610, average charge power 612, and capacitor/single-phase grid power 614 with respect to time 616. When the on-board charger system charges the battery in unity power factor, the waveform of po 632 is the grid power waveform, the waveform of pC 630 is the power of capacitor Cf, the waveform of pin 628 is the power going into the dc side, the waveforms of i 624 and v 622 are the grid current and grid voltage, the waveform of Idc 626 is the current flowing into the dc side, the waveforms of uC 618 and IC 620 are the voltage and current of capacitor Cf. It is illustrated that the capacitor Cf compensates the double line frequency ripple power, as a result pin=po+pC that is constant in the dc side. As there is no the double line frequency ripple power going into the dc side, the constant power of 14.4 kW is charged into the battery. Here, the elimination of the double line frequency current ripple component in the dc side results in a total current ripple decreases of 11% when compared with a conventional method.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain for a vehicle comprising:
    an electric machine, having electrically isolated windings, coupled with an inverter; and a controller programmed to configure respective terminals of the windings to form a Y-connection, and responsive to an electrical connection to establish current flow between the vehicle and a 3-phase power grid, reconfigure the respective terminals such that each is coupled to a respective phase of the 3-phase power grid and responsive to an electrical connection between the vehicle and a single-phase power grid, decouple the Y-connection, couple a capacitor between a first winding terminal and a second winding terminal, and couple the second winding terminal and a third winding terminal to the single-phase power grid.

2. The powertrain of claim 1 further including a triple-pole triple-throw switch that is configured to, in a first throw position couple winding terminals such that the electric machine forms a Y-connection, in a second throw position couple winding terminals to a respective phase of the 3-phase power grid, and in a third throw position couple a single phase power grid and capacitor to the winding terminals.

3. The powertrain of claim 1, wherein the controller is further configured to modulate switches of the inverter to buffer ripple power in the capacitor through windings of the electric machine when coupled with the single-phase power grid.

4. The powertrain of claim 3, wherein the switches of the inverter include high-side switches and low-side switches, and the controller is further configured to modulate all high-side switches of two phase legs equally and modulate all low-side switches of the two phases legs equally, and modulate a third phase leg separately to buffer ripple power.

5. The powertrain of claim 1, wherein the controller is further configured to modulate switches of the inverter to flow a charge to a battery through windings of the electric machine when coupled with the 3-phase power grid.

6. A method of controlling a powertrain comprising: responsive to an electrical connection to establish current flow between a 3-phase power grid and an electric vehicle containing the powertrain, decoupling windings of a Y-connection of an electric machine of the powertrain to electrically isolate the windings, and coupling each of the electrically isolated windings to a phase of the 3-phase power grid; and responsive to an electrical connection between the vehicle and a single-phase power grid, decouple the Y-connection, couple a capacitor between a first winding terminal and a second winding terminal, and couple the second winding terminal and a third winding terminal to the single-phase power grid.

7. The method of claim 6, wherein switches of an inverter include high-side switches and low-side switches, and all high-side switches of three phase legs are modulated together and all low-side switches of the three phase legs are modulated together when charging a battery with the 3-phase power grid.

8. The method of claim 6, wherein each winding has a first and second terminal, further comprising, responsive to an electrical connection between a single-phase power grid and the electric vehicle, coupling a capacitor between a first winding second terminal and a second winding second terminal and couple the second winding second terminal and a third winding second terminal to the single-phase power grid.

9. The method of claim 8 further comprising modulating switches of an inverter of the powertrain according to ripple power from the single-phase power grid to induce a field in each of the electrically isolated windings to buffer the ripple power in the capacitor.

10. The method of claim 9, wherein the switches of the inverter include high-side switches and low-side switches, and all high-side switches of two phase legs are modulated together and all low-side switches of the two phase legs are modulated together, and a third phase leg's switches are modulated independently of switches of the two phase legs.

11. A vehicle powertrain comprising:
an electric machine having electrically isolated windings; and
a switch configured to couple respective terminals of the windings to form a Y-connection, and responsive to an electrical connection between the vehicle and a single-phase power grid, disconnect the Y-connection, couple a capacitor between a first winding terminal and a second winding terminal, and couple the second winding terminal and a third winding terminal to the single-phase power grid and responsive to an electrical connection to establish current flow between the vehicle and a 3-phase power grid, decouple the Y-connection and couple each winding terminal to a phase of the 3-phase power grid.

12. The vehicle powertrain of claim 11 further comprising an inverter coupled with the electric machine, and wherein the switch is further configured to modulate switches of the inverter to buffer ripple power in the capacitor through windings of the electric machine.

13. The vehicle powertrain of claim 12 further comprising an inverter coupled with the electric machine, and a controller that is configured to modulate switches of the inverter to balance reactive power through windings of the electric machine.

14. The vehicle powertrain of claim 13, wherein a charge current in the electric machine induces a transient torque of the electric machine that is negated over a time-period defined by a predetermined number of cycles the switches are modulated such that a steady state torque is zero.

15. The vehicle powertrain of claim 13, wherein the switches include high-side switches and low-side switches, and the switch is further configured to modulate all high-side switches of two phase legs equally and module all low-side switches of the two phase legs equally, and a third phase leg's switches are modulated independently of switches of the two phase legs when charging a battery with single-phase power grid system.

16. The vehicle powertrain of claim 11, wherein the switch is further configured to, responsive to a disconnection between the vehicle powertrain and a power grid, couple together the winding terminals to form a Y-connection.

17. The vehicle powertrain of claim 11, wherein the switch is a triple-pole triple-throw switch that is configured to, in a first throw position couple winding terminals such that the electric machine forms a Y-connection, in a second throw position couple winding terminals to a respective phase of the 3-phase power grid, and in a third throw position couple a single phase power grid and capacitor to the winding terminals.

* * * * *